United States Patent [19]
Yaniv

[11] Patent Number: 5,959,710
[45] Date of Patent: Sep. 28, 1999

[54] DISPLAY DEVICE WITH SPACERS MADE OF CARBON, GRAPHITE OR DIAMOND AND METHOD OF MAKING SAME

[75] Inventor: Zvi Yaniv, Bloomfield Hills, Mich.

[73] Assignee: SI Diamond Technology, Inc., Austin, Tex.

[21] Appl. No.: 08/697,534

[22] Filed: Aug. 26, 1996

[51] Int. Cl.⁶ .................................................. G02F 1/1339
[52] U.S. Cl. .......................................... 349/155; 349/156
[58] Field of Search ...................................... 349/155, 156

[56] References Cited

U.S. PATENT DOCUMENTS

| | | | |
|---|---|---|---|
| 4,519,678 | 5/1985 | Komatsubara et al. ................. | 349/113 |
| 4,556,288 | 12/1985 | Sekimura ................................. | 349/137 |
| 4,744,639 | 5/1988 | Tsuboyama .............................. | 349/156 |
| 5,132,676 | 7/1992 | Kimura et al. ............................ | 349/52 |
| 5,138,473 | 8/1992 | Dijon et al. .............................. | 349/155 |
| 5,181,132 | 1/1993 | Shindo et al. ........................... | 349/155 |
| 5,379,139 | 1/1995 | Sato et al. ................................ | 349/155 |
| 5,612,803 | 3/1997 | Yamada et al. .......................... | 349/156 |
| 5,644,371 | 7/1997 | Koden et al. ............................. | 349/156 |
| 5,719,653 | 2/1998 | Minato et al. ........................... | 349/156 |
| 5,726,728 | 3/1998 | Kondo et al. ............................ | 349/156 |
| 5,751,382 | 5/1998 | Yamada et al. .......................... | 349/156 |

FOREIGN PATENT DOCUMENTS

| | | | |
|---|---|---|---|
| 0039871 | 11/1981 | European Pat. Off. ................ | 349/156 |
| 58-199326 | 11/1983 | Japan ..................................... | 349/155 |
| 61-183625 | 8/1986 | Japan ..................................... | 349/156 |
| 1-167731 | 7/1989 | Japan ..................................... | 349/155 |
| 4-238325 | 8/1992 | Japan ..................................... | 349/155 |
| 5-142548 | 6/1993 | Japan ..................................... | 349/155 |
| 86/05283 | 9/1986 | WIPO .................................... | 349/156 |

*Primary Examiner*—William L. Sikes
*Assistant Examiner*—Toan Ton
*Attorney, Agent, or Firm*—Winstead Sechrest & Minick P.C.

[57] ABSTRACT

An electronic display 10 such as a flat panel display device includes spacing layers 70–88 operatively disposed around the display pixels. The spacing elements are formed by depositing a material, such as a carbon material, and selectively etching back the layer to pre-selected areas. This has the advantage of precisely placing the spacers where support is necessary, while avoiding problems with misplacement of spacers and the resulting loss of manufacturing yield.

15 Claims, 5 Drawing Sheets

DISPLAY DEVICE WITH SPACERS MADE OF CARBON, GRAPHITE OR DIAMOND AND METHOD OF MAKING SAME

TECHNICAL FIELD

This invention relates in general to flat panel display devices, and in particular to display devices having controllably placed spacers disposed in pre-selected, localized areas that are pressure complying.

BACKGROUND

Flat panel display devices are increasingly gaining market acceptance for a variety of different applications. For example, active matrix liquid crystal displays (AMLCD's) have found widespread use as the video monitor in laptop computers, video cameras, and avionic navigation modules, to name a few. Other types of display devices such as electroluminescent (EL) and field emission displays (FED's) are also used in a variety of industrial and consumer settings. The advantage of each of these types of displays resides in the fact that they are all substantially flat. The elements which cause the device to generate an optical effect, whether an AMLCD picture element ("pixel"), or an FED emitter, are sandwiched between two parallel sheets of glass substrates. The spacing between the substrates is critical, and must be uniformly maintained across the entire display face. The spacing between the parallel sheets of glass is on the order of between 1 and about 1,000 $\mu$m, depending on the type of display.

Heretofore, uniform spacing has been achieved by the use of spacers disposed between the glass sheets. These spacers have typically taken the form of glass rods, such as optical fibres, or glass spheres, all of the desired size to assure proper spacing. These rods or spheres were then either randomly scattered across the surface of one glass substrate prior to lamination of the second sheet, or randomly dispersed in the display medium, i.e., liquid crystal material, prior to injection between the sealed sheets. This has made for numerous problems impacting on display performance, manufacturing yield, and above all cost of these displays.

Deposition of these spacers has been performed by precalculating an initial concentration of spacers for a given area. Thereafter, a reservoir of spacers is positioned above a substrate, and gas is blown into the reservoir, ejecting the spacers. Gravity assures that the spacers fall to the underlying surface, but can do nothing to assure uniform distribution across the substrate, nor their density.

Moreover, this deposition process can do nothing to assure that the spacers do not land on critical circuit elements of the display device. For example, in an AMLCD, a spacer may land upon the pixel current blocking element, i.e., the transistor or diode. This invariably results in either the blocking element being crushed on assembly, or causing a short circuit between the two substrates. In either case, the pixel is inoperative, causing a defect in the display, thus reducing display yield. Alternatively, if the spacer lands upon the pixel electrode, this can contribute to light scattering, and diminished optical performance of the pixel and display. Other problems may result when the spacer conducts heat from the substrate nearest the backlight (in AMLCDs) to the front substrate. These problems are graphically illustrated in FIG. 1, in which a prior art display device is shown. The display device 1, includes first and second display substrates 2, 3, with a current blocking element 4 disposed on the first substrate, and associated with a first electrode 5. A spacer sphere 6 has been dropped on the current blocking element 4, essentially rendering it unusable. This results in a short circuit between the substrates, an inoperative picture element, and localized heating on the viewer proximal side of the display device.

Accordingly, there exists a need for a display device which includes spacers properly located between the glass substrates, in proper densities, and the proper location. The spacers must properly separate the glass substrates, while avoiding contact with the display elements. The display should be fabricated by a process which is readily compatible to the semiconductor processes routinely used in the display fabrication.

SUMMARY OF THE INVENTION

Briefly, according to the invention, there is provided a flat panel display device comprising first and second display substrates arranged in spaced, parallel relationship. At least one of the substrates has deposited thereon a plurality of display elements. The display elements may be for example, display electrodes, emitters, or blocking elements to name a few. Disposed on the substrate, either between or around (or both) each display element is deposited a spacing element or spacer. The spacing element is adapted to maintain a uniform distance between the parallel glass substrates. The spacing elements may be either disposed on the substrate subsequent to the fabrication of the display elements, or may be concurrently deposited as by, for example, a semiconductor fabrication process, i.e., photolithography.

The spacing elements themselves may be fabricated of a material selected from the group consisting of carbon, such as diamond films, diamond/graphite films and coatings that provide both high electrical insulation and high thermal transfer. In one embodiment, the spacing elements are fabricated of a deposited carbon material, preferably, the deposited carbon material is diamond. Moreover, the display may further include a layer of compliant material, and/or optical isolating material, such as a black polyimide material, between each display element, and said spacing element is deposited atop said compliant material and/or optical isolating material.

Also disclosed is a method of fabricating a flat panel display device. This method comprises the steps of depositing a plurality of display elements on a first substrate, of two closely arranged, parallel glass substrates. Thereafter, one selectively deposits spacing elements at least partially around at least one or more of the display elements.

The method contemplates fabricating the spacing elements by depositing materials, and thereafter using a photolithographic process to selectively remove material from pre-selected locations. The spacers may be fabricated by processes such as DC glow discharge, hot filament discharge, chemical vapor deposition, plasma enhanced chemical vapor deposition, conformal coating processes and combinations thereof.

These and other advantages of the instant invention will become apparent from a perusal of the following detailed description, drawings and claims.

DETAILED DESCRIPTION OF THE PREFERRED EMBODIMENT

Figure 1:
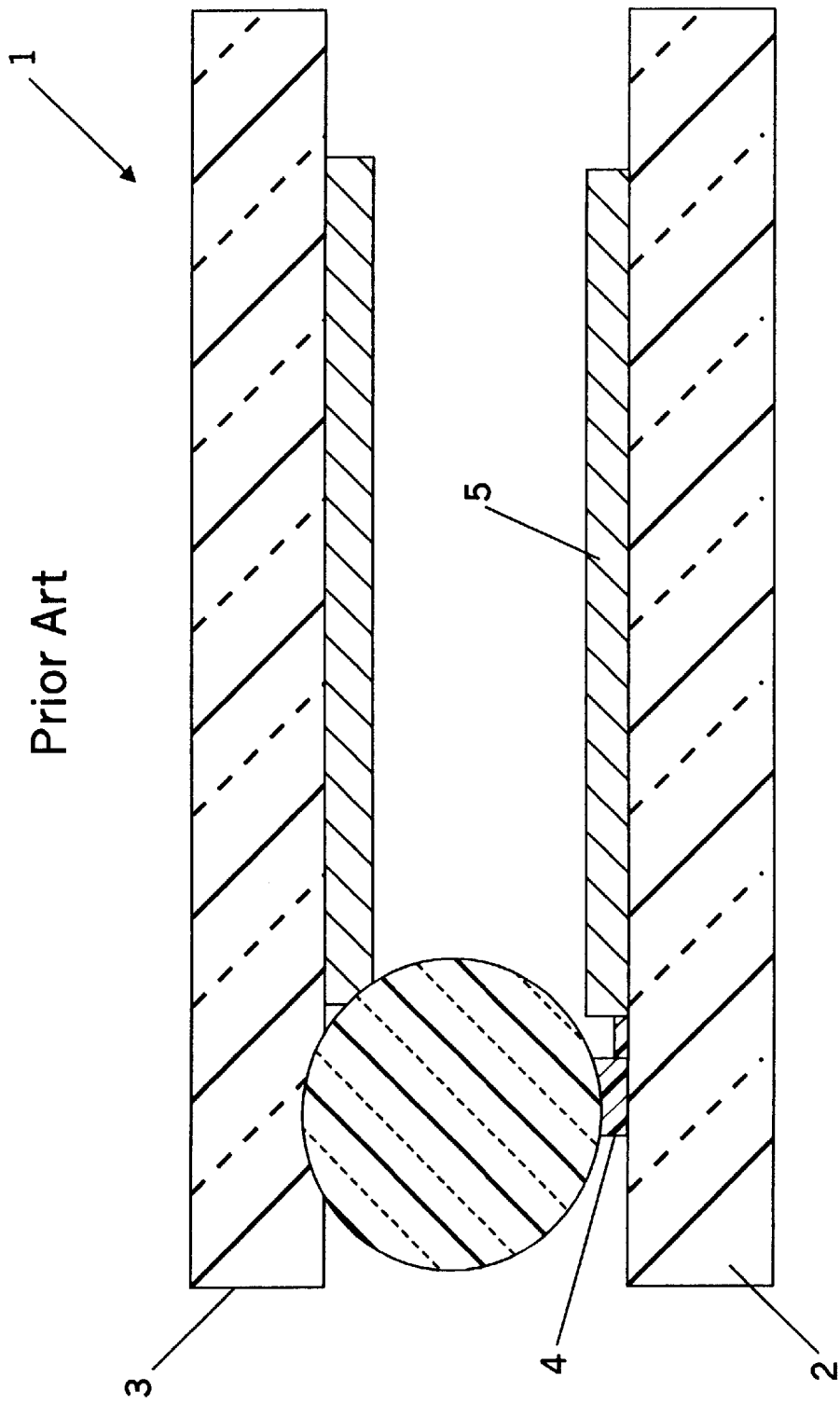
FIG. 1 is a cross-sectional side view of a display device according to the prior art.

While the specification concludes with claims defining the features of the invention that are regarded as novel, it is believed that the invention will be better understood from a consideration of the following description in conjunction with the drawing figures, in which like reference numerals are carried forward.

Figure 2:
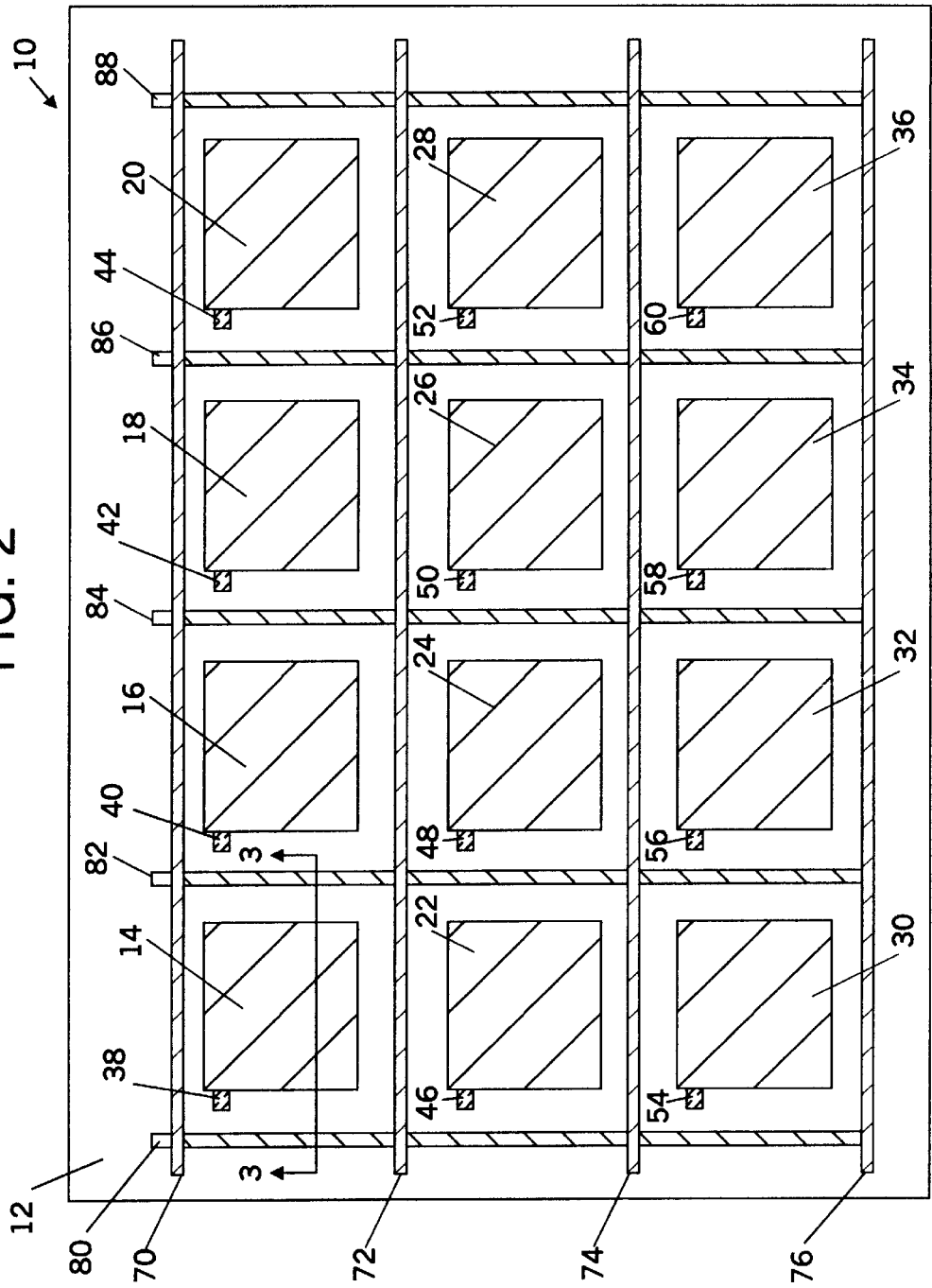
FIG. 2 is a partial front elevational view of a display device including spacers, in accordance with the instant invention.
Figure 3:
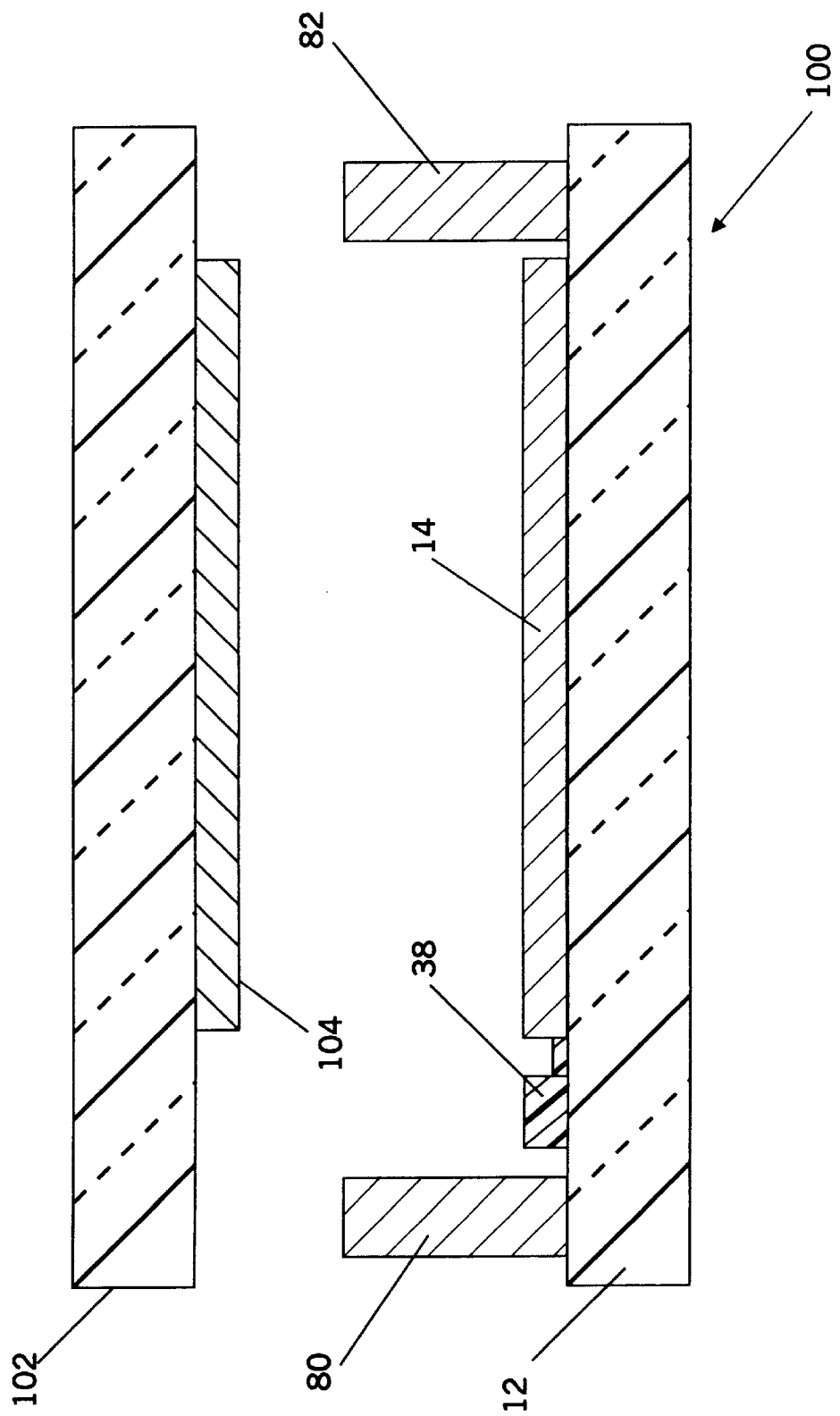
FIG. 3 is a cross-sectional side view, taken long line 3—3 of FIG. 2.

Referring now to the drawings and specifically to FIG. 2, there is shown a front elevational representation of a display device 10 including spacers in accordance with the instant invention. The display device 10 includes a first substrate 12 and a second substrate 102 as illustrated in FIG. 3. The first substrate 12 may be fabricated of any of a number of known materials, depending upon the type of display desired. For example, the substrate 12 may be fabricated of a glass, such as Corning 7059 glass in the embodiment in which the display 10 is an AMLCD. Other types of glasses, plastics, ceramics, and polymers may be used depending upon the display type.

In FIG. 2, it will be assumed that the display device 10 is an AMLCD, though it is to be specifically noted that the invention is not so limited. Any other type of flat panel display is contemplated by the instant invention. Disposed on the substrate 12 is a plurality of display elements 14, 16, 18, 20, 22, 24, 26, 28, 30, 32, 34, 36. While only twelve elements are illustrated in FIG. 1, it is to be understood that the invention is not so limited. Any number of elements arranged in any configuration is contemplated by the invention. In this embodiment, the display elements 14–36 are the first electrode of a liquid crystal pixel. The second electrode 104 is deposited on the second substrate 102, as will be illustrated in greater detail hereinbelow with respect to FIG. 3. The display electrodes 14–36 are fabricated of a transparent conductive oxide, examples of which include indium tin oxide, tin oxide, thin film metals, doped semiconductor materials, and other materials appropriate for other types of displays such as photon emissive displays, electroluminescent materials, plasma displays and others.

Each display element 14–36 includes a corresponding blocking element 38, 40, 42, 44, 46, 48, 50, 52, 54, 56, 58, 60. The blocking elements 38–60 may be, for example one or more transistors or diodes electrically coupled to the display elements 14–36. The blocking elements 38–60 are also electrically coupled to driver elements by conductive lines (not shown) in a manner well know in the art. The blocking elements 38–60 are typically fabricated of amorphous silicon in a manner well known in the art.

Disposed between and around each display element is a spacer element. These take the form, in FIG. 2, of continuous lines of material, specifically row lines 70, 72, 74, 76, and column lines 80, 82, 84, 86, 88. The spacing elements 70–76, 80–88 themselves may be fabricated of a material selected from the group consisting of carbon, graphite, or diamond, preferably in mono-crystalline, poly-crystalline and micro-crystalline form. In one embodiment, the spacing elements 70–76, 80–88 are fabricated of a deposited carbon material, preferably, the deposited carbon material is diamond. The deposited diamond material may be deposited before, after or concurrently with the deposition of the display elements 14–36. This can be accomplished via conventional photolithographic techniques, and/or by a process of simultaneous deposition and selective etching.

Referring now to FIG. 3, there is illustrated therein a cross-sectional side view of a single pixel 120 from the display device 10 of FIG. 2, taken along line 3—3 thereof. The pixel 100 includes substrate 12, as well as substrate 102 fabricated of a material similar to that used for substrate 12. Disposed on substrate 12 is first pixel electrode 14, while a second pixel electrode 104 is deposited on substrate 102. Blocking element 38 is deposited on substrate 12, and is electrically coupled thereto, as by a conductive lead.

Deposited around the first pixel electrode 14 is the spacer elements 80 and 82 of FIG. 1. When the substrates 12 and 102 are brought into proper alignment, the pixel electrodes 14, 104 will be positioned opposite one another, with the two substrates 12, 102 separated a uniform distance by the spacers 30, 32. In this regard, the spacers 30, 32 are deposited on the first substrate 12, while the second substrate 102 is urged against them for assembly. When fully assembled, the space between the electrodes 14, 104 is filled with a liquid crystal material.

Figure 4:
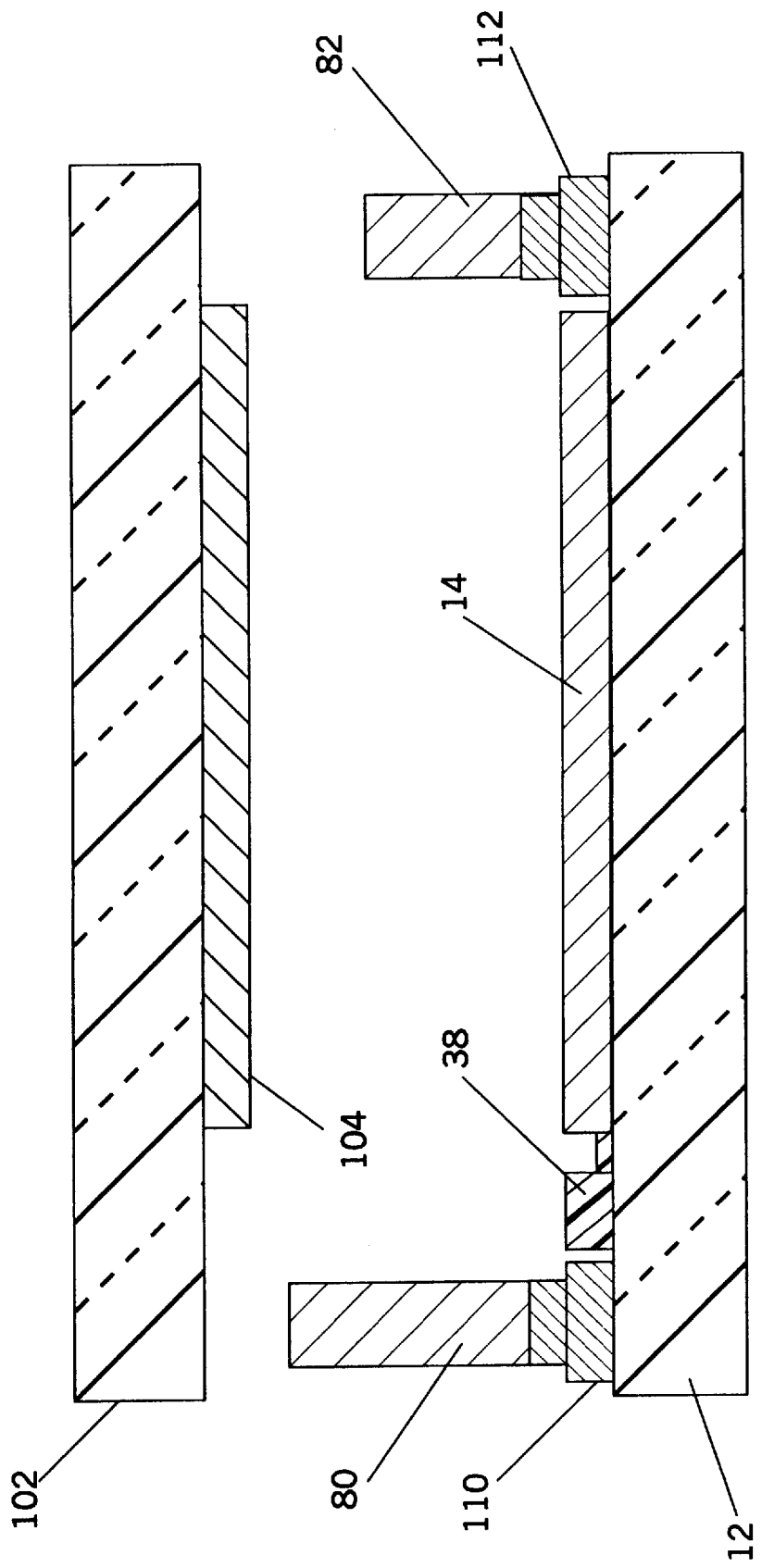
FIG. 4 is a cross-sectional side view of a display pixel illustrating a second embodiment of a display device including spacers, in accordance with the instant invention.

Referring now to FIG. 4, there is illustrated therein a second embodiment of the display described hereinabove with respect to FIG. 2. Specifically, the display in this case includes compliant layers 110, 112 between each pixel. These compliant layers 110, 112 are provided to allow the spacer/compliant layer to be compressible by up to 30% of the original size of the spacer and layer. This means that the spacers can therefore compensate for deviations in substrate surface features and flatness deviations, thus assuring that the overall display remains appropriately flat.

The compliant layers 110, 112 are preferably formed of materials compatible with the display fabrication process, such as polyimide or other organic polymeric materials compatible with various types of displays. The layer of compliant material may further include a layer of a dielectric material such as silicon oxide, silicon nitride or silicon carbide, or a metallic layer deposited thereon, but subjacent the layer of diamond spacer material. In another embodiment, the polyimide material is a black polyimide material that afford the further feature of preventing light "contamination" between adjacent pixels, causing undesirable optical artifacts. These optical blocking elements are commonly fabricated of deposited, etched layers of a black polyimide material, as is disclosed in, for example, U.S. Pat. No. 5,576,070 to Yaniv, the disclosure of which is incorporated herein by reference.

Figure 5:
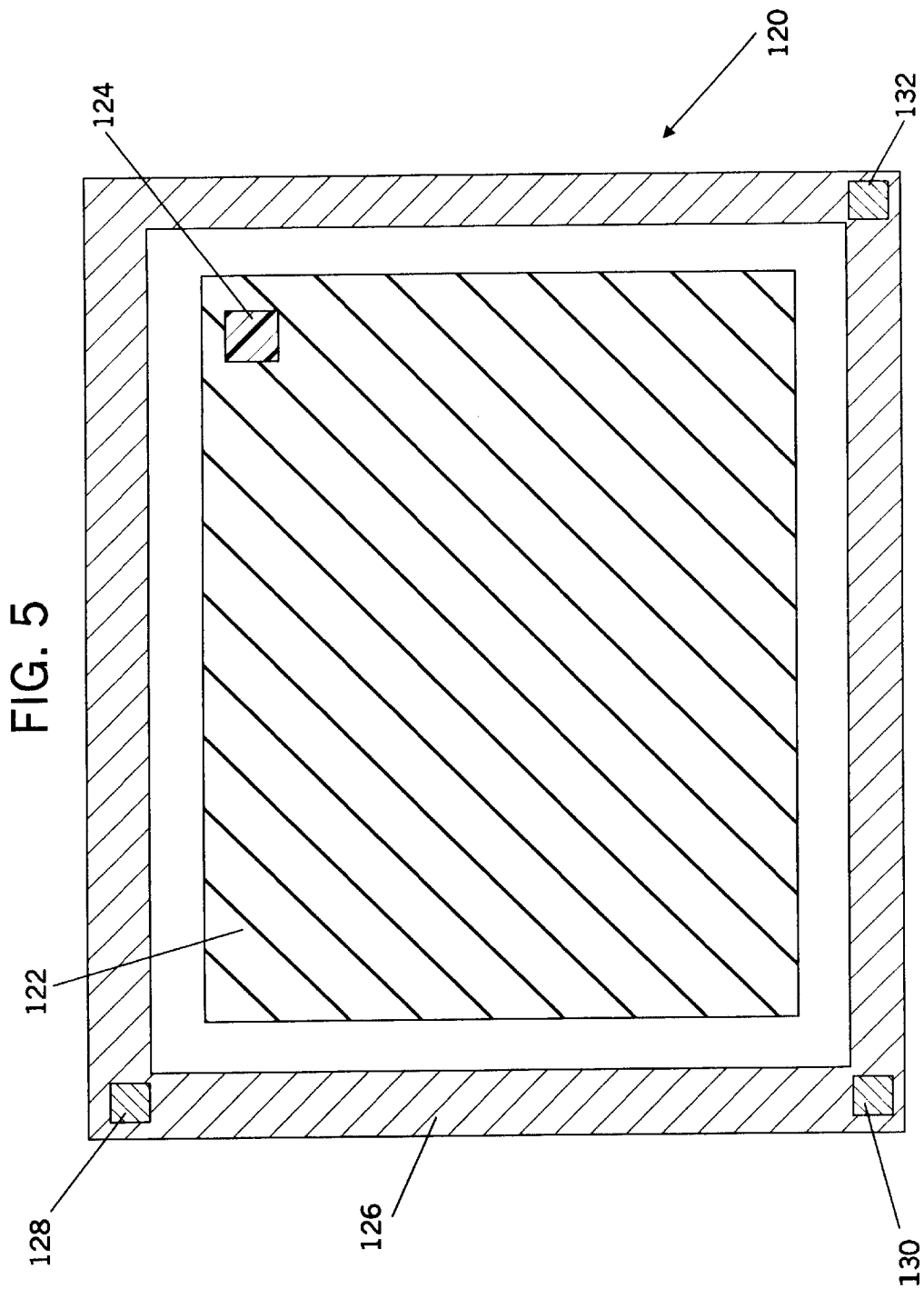
FIG. 5 is a front elevational view of a single display pixel, including spacers, in accordance with the invention.

It is to be noted that one important feature of the spacing elements described herein is the fact that they are "complying" spacing elements. By this it is meant that the spacers are compressible by about 30% of the original size. This means that the spacers can therefore compensate for deviations in substrate surface features and flatness deviations, thus assuring that the overall display remains appropriately flat. Moreover, it is important to appreciate the fact that the spacers can be repeatably deposited precisely in pre-selected locations of each pixel. For example, and referring now to FIG. 5, there is illustrated therein a front elevational view of a single pixel 120 including a pixel electrode 122 and a pixel transistor 124. Disposed around the electrode 122 is a layer of compliant material 126. Three spacers 128, 130, 132 are deposited on the layer of compliant material 126. Thus, one can repeatably deposit the spacers 128–130 in pre-selected locations, such as the three corners of each pixel not occupied by the blocking element, thus avoiding the problems described above with respect to FIG. 1. Also, to the extent that heat dissipation is an issue, heat transfer from the back substrate to the front can now be made even and uniform across the entire display, as opposed to having localized areas of high heat transfer, as in the prior art illustrated in FIG. 1. Indeed, a continuous layer of diamond material may be used to assure better cooling of either substrate layer.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A flat panel display device comprising first and second display substrates arranged in spaced, parallel relationship, at least one of said substrates having a plurality of display elements disposed thereon, and a plurality of substrate spacing elements lithographically deposited around and between said display elements, wherein said spacing elements are fabricated of a deposited carbon material.

2. A flat panel display device as in claim 1, wherein said spacing elements are formed in pre-selected locations, and in a controlled, pre-selected density.

3. A flat panel display device as in claim 1, wherein the deposited carbon material is diamond.

4. A flat panel display device as in claim 1, wherein said spacing elements are formed by a process selected from the group of DC glow discharge, hot filament discharge, chemical vapor deposition, plasma enhanced chemical vapor deposition, and combinations thereof.

5. A flat panel display device as in claim 1, further including a layer of a compliant material.

6. A flat panel display device as in claims 5, wherein said layer of compliant material is disposed between one said substrate and said spacing elements.

7. A flat panel display device as in claim 5, wherein said compliant layer is fabricated of an organic polymeric material.

8. A flat panel display device as in claim 1, wherein the display further includes a layer of optical isolating material between pairs of display elements, and said spacing element is deposited atop said optical isolating material.

9. A flat panel display device comprising first and second display substrates arranged in spaced, parallel relationship, at least one of said substrates having a plurality of display elements disposed thereon, and a plurality of substrate spacing elements lithographically formed around and between said display elements, wherein the spacing elements are fabricated of a material selected from the group consisting of graphite, diamond, and combinations thereof.

10. A flat panel display device comprising first and second display substrates arranged in spaced, parallel relationship, at least one of said substrates having a plurality of display elements disposed thereon, and a plurality of substrate spacing elements lithographically formed around and between said display elements, further including a layer of a compliant material, wherein said compliant layer and said spacing element together are compressible by about 30%.

11. A method of fabricating a flat panel display device comprising the steps of:

depositing a plurality of display elements on a first substrate; and selectively depositing spacing elements at least partially around at least one of said display elements, wherein the spacing elements are fabricated of a material selected from the group consisting of graphite, diamond, and combinations thereof.

12. A method of fabricating a flat panel display device comprising the steps of:

depositing a plurality of display elements on a first substrates; and selectively depositing spacing elements at least partially around at least one of said display elements, wherein the spacing elements are fabricated of a deposited carbon material.

13. A method of fabricating a flat panel display device as in claim 12, wherein the deposited carbon material is diamond.

14. A flat panel display device comprising first and second display substrates arranged in spaced, parallel relationship, at least one of said substrates having a plurality of display elements disposed thereon, and a plurality of multi-layered substrate spacing elements deposited around and between said display elements, wherein said multi-layered spacing elements comprise at least a first compliant layer, and a second spacing layer, wherein said second spacing layer is fabricated of a deposited diamond material.

15. A flat panel display device as in claim 14, wherein said first compliant layer is fabricated of a organic polymeric material.

* * * * *